UNITED STATES PATENT OFFICE.

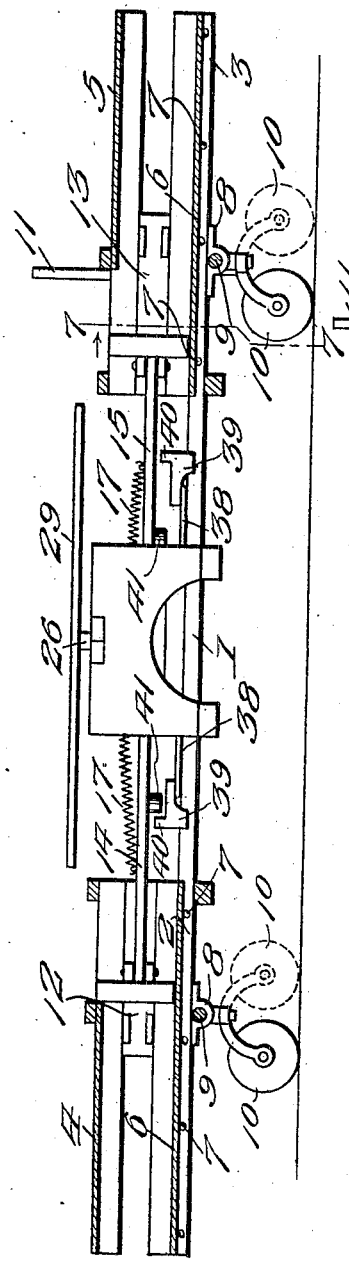

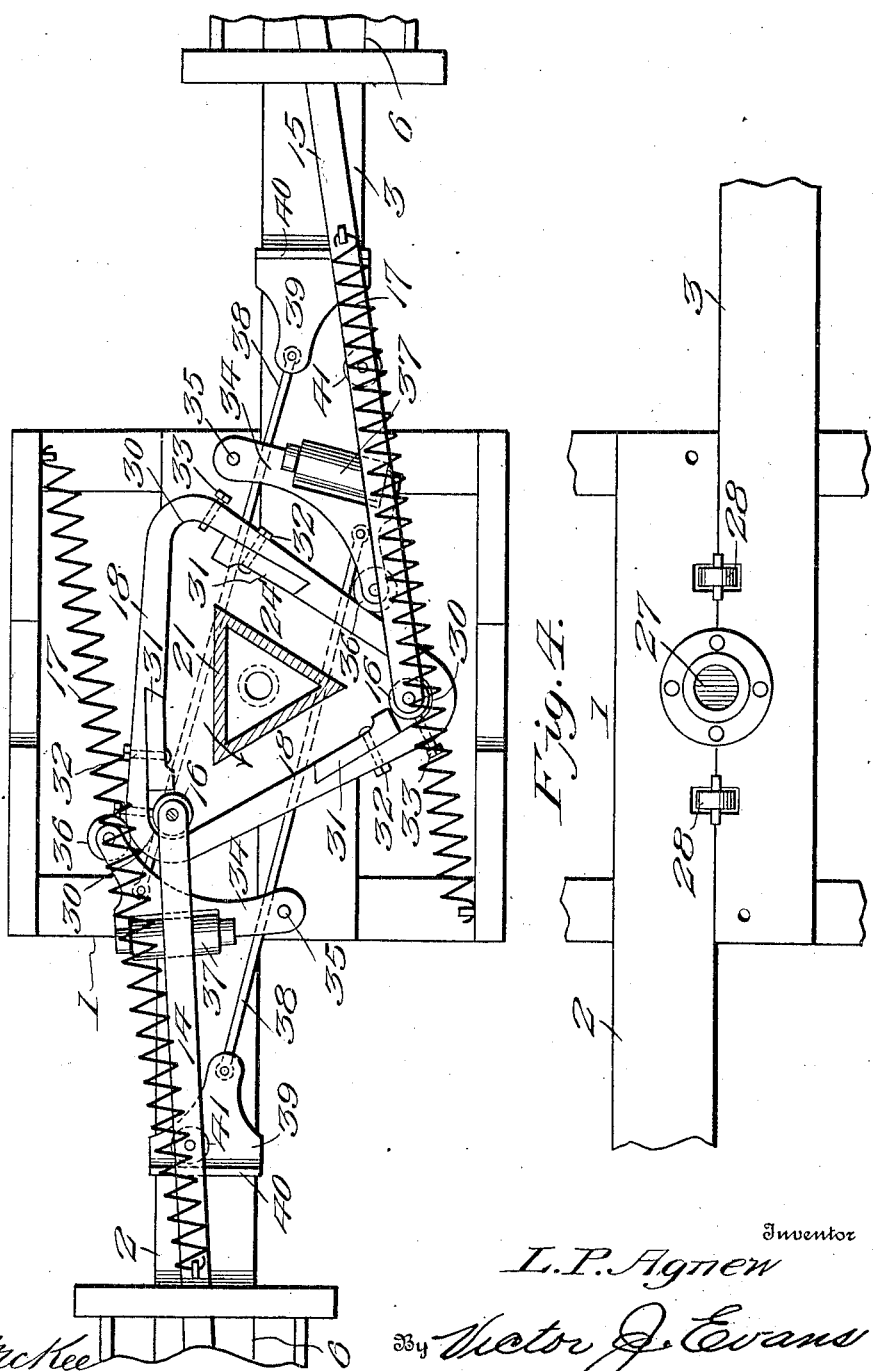

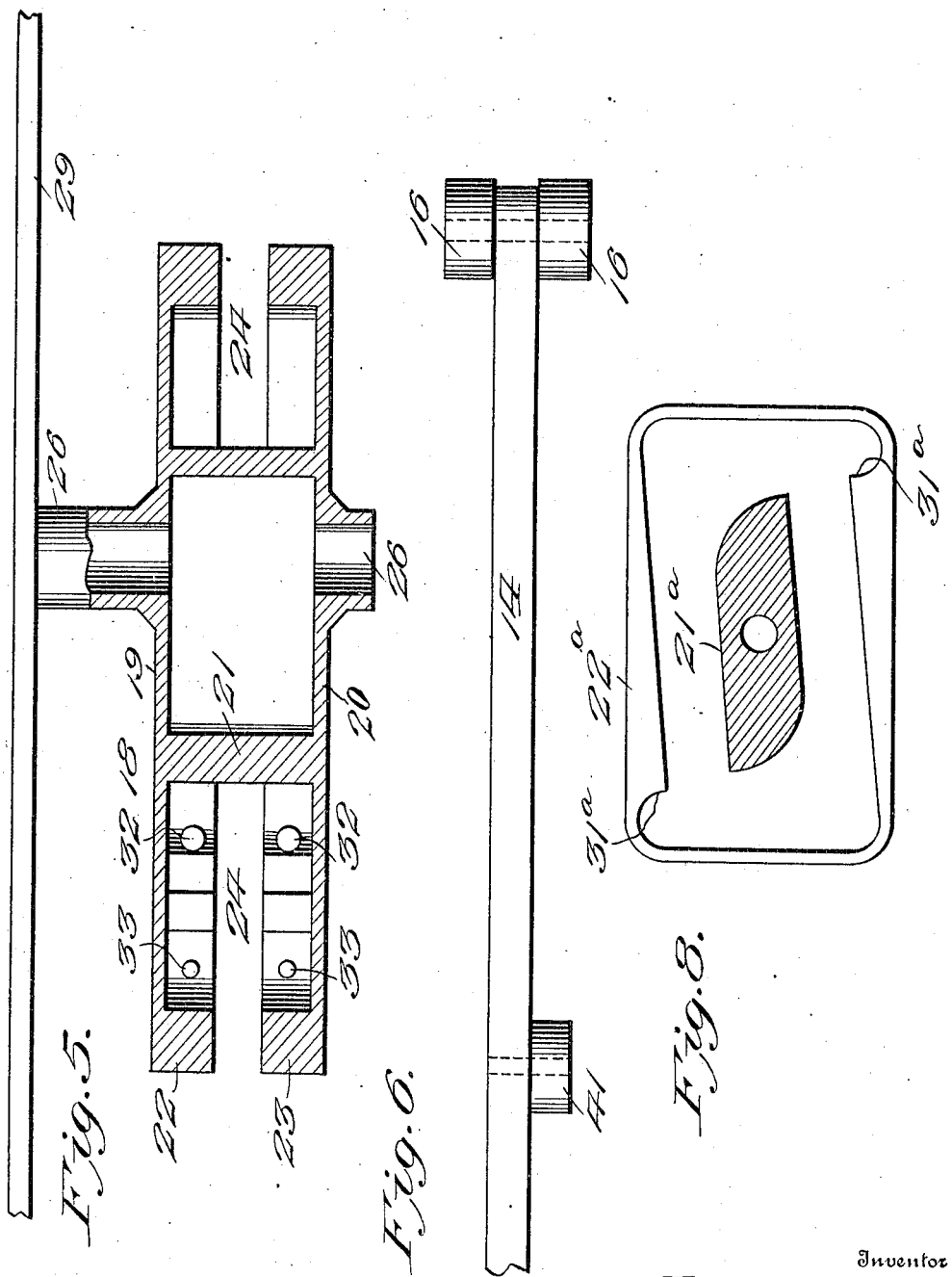

LEWIS P. AGNEW, OF WAPANUCKA, INDIAN TERRITORY.

BALING-PRESS.

No. 852,252.　　　Specification of Letters Patent.　　　Patented April 30, 1907.

Application filed August 22, 1906. Serial No. 331,628.

*To all whom it may concern:*

Be it known that I, LEWIS P. AGNEW, a citizen of the United States, residing at Wapanucka, in District 23, Indian Territory, have invented new and useful Improvements in Baling-Presses, of which the following is a specification.

This invention relates to improvements in baling presses designed for use in baling hay and other analogous materials, the main object of the invention being to provide a simple, compact and powerful plunger-operating mechanism by which the baling plungers may be operated a plurality of times on each complete revolution of the sweep or primary power appliance.

Another object is to provide in connection with spring retracted plungers means for positively starting said plungers on their return stroke so as to prevent any possible binding thereof in the baling boxes or chambers, such starting means being actuated by the plunger operating mechanism.

Still another object is to provide a baling press which may be folded or contracted for convenience in transporting it from place to place, and to provide supporting wheels therefor which may be readily and conveniently thrown into and out of operative position at will.

With the above and other objects in view, the invention consists of the novel construction, combination and arrangement of parts hereinafter fully described and claimed, reference being had to the accompanying drawings, in which:—

Figure 1 is a view in side elevation, with the press boxes in longitudinal section, of a baling press embodying my invention, showing the caster wheels projected to adapt the press to be moved from place to place. Fig. 2 is a side elevation, showing the caster wheels folded up to allow the press to rest squarely on the ground for operation. Fig. 3 is a sectional plan view of the plunger operating mechanism. Fig. 4 is a plan view of the main frame. Fig. 5 is a vertical longitudinal section through the power head. Fig. 6 is a side elevation of one of the pitmen. Fig. 7 is a cross section on line 7—7 of Fig. 1, omitting the plunger and showing in detail the mode of mounting the caster wheels. Fig. 8 is a horizontal section through a modified form of power head.

Referring to the drawings, the numeral 1 designates the central main frame of the apparatus, from the opposite sides of which extend supporting bars or beams 2 and 3. These bars or beams are disposed out of longitudinal alinement but in parallel relation and carry the baling boxes or chambers 4 and 5, which are provided with bottom guideways 6 through which the bars extend, thus slidably mounting the boxes on the bars so as to permit said boxes to be adjusted toward and from the frame 1, whereby the apparatus may be contracted for storage or transportation and extended for the operation of baling. The side walls of the boxes are provided with openings to register with transverse openings in the bars 2 and 3, so that transverse bolts 7 may be passed therethrough to rigidly connect the boxes with the bars in either of their positions of adjustment. Each box carries a bearing 8 in which is journaled a rock shaft 9 upon which are pivotally mounted caster wheels 10, and to said shaft is fixed an adjusting lever 11 whereby the shaft may be turned to project the wheels below the boxes to rest upon the ground surface, thus enabling the apparatus to be conveniently drawn from place to place. Fig. 1 shows the wheels projected, from which it will be seen that the levers 11 stand vertically, and by turning the levers to a horizontal position the wheels may be retracted or folded upwardly on opposite sides of the press boxes and above the bottom portions thereof, thus allowing the boxes to rest squarely upon the ground for a firm support during the baling operation. In practice, the baling boxes are adjusted inwardly on the bars 2 and 3 to reduce the length of the apparatus when it is to be transported, thus enabling it to be more easily turned or steered on the supporting wheels.

Plungers 12 and 13 operate in the respective boxes 4 and 5, and to these plungers are pivotally connected the outer ends of pitmen or actuating rods 14 and 15, each of which is provided at its inner end with a friction roller 16. The plungers are actuated on their outward or working stroke by power mechanism, hereinafter described, and are adapted to be retracted by springs 17 connecting the same with the main frame 1.

The power means for operating the plungers comprises a rotary power head or eccentric 18, which is of triangular form and comprises upper and lower parallel plates 19 and 20 intermediately connected by a hollow triangular hub or spreader 21. The plates are provided with inwardly extending flanges 22 and 23 properly spaced by the hub or spreader to provide an intervening slot or guideway 24 through which the inner ends of the pitmen 14 and 15 extend into the channel between the plates 19 and 20, the arrangement of the hub or spreader 21 being such as to also provide a channel or guideway 24' on the interior of the power head or eccentric in which the friction rollers 16 of the pitmen travel as said head or eccentric is rotated. On the power head are bearing members 26 whereby the head is mounted for rotation on a pivot bolt 27 carried by the main frame 1, on which are rollers 28 with which the bottom plate 20 of the head turns in contact, thus enabling the head to rotate with a minimum degree of friction. A sweep 29 is suitably fixed to the head and in practice may be provided with suitable draft connections for the attachment of draft animals or for the application thereto of any preferred type of power mechanism.

The friction rollers 16 on the inner ends of the pitmen 14 and 15 travel in contact with the inner faces of the triangular flanges 22 and 23 of the head, which act thereon in the nature of cams or eccentrics to effect the projection and permit of the retraction of the plungers. The corner angles of the flanges form seat recesses 30 in which the rollers 16 seat at the limit of their movements, and fitted upon the flanges in rear of said recesses in the direction of rotation of the head are shoes or blocks 31 adapted to engage the rollers to transmit motion to the pitmen, each of said shoes being preferably fitted within a recess in the flange and secured in position by a bolt 32.

Fig. 3 represents the position of the parts at the time when the pitman 14 connected with the plunger 12 is at the limit of its outward movement and about to be released by the coacting shoe for retraction by its spring 17 and the roller of the pitman 15 is about to be engaged by the adjacent shoe to force the plunger 13 on its working stroke. The head revolves in the direction of the arrow shown in Fig. 3, and it will thus be apparent that as it continues to turn the pitman 14 will be released and will be retracted by its spring for subsequent engagement with the following shoe, while the pitman 15 will be forced outward by the coacting shoe to project the plunger 13, until the said shoe acting on said pitman 15 reaches the position occupied by the free or non-working shoe at the upper right hand corner of the head, when it will be released to permit the plunger 13 to be retracted. Each punger will, therefore, be actuated three times on each complete revolution of the power head, resulting in the formation of six bales on each working operation. By disconnecting one pitman, one of the plungers and boxes may be thrown out of operation, so that three bales may be formed in the other press box on each revolution of the power head. Adjustable contact devices, in the form of screws 33, are provided adjacent the seat recesses 30 to engage the friction wheels 13 and maintain the same in proper working relation to the shoes 31.

In order to prevent any possibility of the plungers sticking or hanging in the press boxes so that they cannot be returned by their retracting springs 17, means are provided for positively starting said plungers on their return stroke. To this end, a bell crank lever 34 is arranged on each side of the frame for coöperation with each pitman, the lever being pivoted at one end, as at 35, to the frame, and provided at its opposite end with a friction roller 36 to engage and travel on the outer face of the flange 23 of the power head. The levers carry friction rollers 37 which contact with the pitmen, which move over the same during their operation, to permit said pitmen to work thereon without friction. The lever on the side of the frame adjacent the pitman 15 is connected by a pivoted rod or link 38 with a slide or traveler 39 movable on the bar 2 and having a flange or projection 40 to engage a roller 41 on the pitman 14, while the lever mounted adjacent the pitman 14 is in the same manner connected with a similar slide working on the bar 3 and adapted to engage a roller on the pitman 15. As each pitman is freed from the coöperating working shoe on the power head at the limit of the working movement of its plunger, the lever 34 associated therewith is rocked on its pivot by the cam action of the power head thereon and thus draws upon the slide 39, whose flange 40 engages the roller 41 and transmits a positive return starting movement to the pitman, thus enabling it to be fully retracted by its spring to return the plunger to normal position. On the out stroke of the pitman the roller 41 engages the flange 40 and restores the slide 39 and its actuating lever to normal position, as will be readily understood.

The power head or eccentric may be varied in construction to adapt it to operate each pitman a greater or lesser number of times upon each working revolution thereof. In Fig. 8 I have shown a form of power head or eccentric adapted to operate the pitman twice upon each working revolution thereof. In this form of the power head, upper and lower rectangular plates are employed which are connected by a cam boss 21ª, and the sides of these plates are provided with cam flanges 22ª having terminal working shoes or shoulders 31ª. Fig. 8 shows only the bottom plate of this form of the head, but it will be understood that, like the head 18, this form of the device is provided with upper and lower plates joined by the boss 21ª. The operation with this construction will be readily understood.

It will be seen from the foregoing description, taken in connection with the drawings, that the invention provides a baling apparatus in which provision is made for the operation of the baling plungers a plurality of times upon each rotation of the sweep, thus enabling a maximum number of bales to be formed in a minimum working period, and also that the construction of the working mechanism is such as to secure a high degree of power on each compressing stroke of the pitmen. By the use of the means for positively starting the plungers on their return stroke, liability of the hanging of the plungers is prevented, while the construction of the starting mechanism is such as to obviate the use of applied power to completely return the plungers, as the retracting springs will effect this operation as soon as the plungers are started on their return movement. Furthermore, by adjustably mounting the baling boxes on the frame in the manner described and providing the caster wheels and their adjusting devices, the apparatus may be shortened for convenient transportation and extended for the working operation in a convenient manner, and on arriving at the point where the work is to be done may be rested in direct contact with the ground to secure a firm foundation by simply retracting or folding the caster wheels. A simple construction of parts is also provided, thus enabling the machine to be manufactured and sold as a comparatively low cost.

Having thus described the invention, what is claimed as new, is:—

1. In a baling press, the combination of a frame carrying press boxes, plungers operating therein, spring retracted pitmen connected with the plungers, an eccentric for actuating the pitmen on their working stroke, bell crank levers on the frame having friction rollers engaging the outer face of the eccentric, whereby said levers are adapted to be rocked by the eccentric, contacts on the pitmen, and means controlled by the bell crank levers to engage said contacts to impart movement to the pitmen to start the plungers on their return stroke.

2. In a baling press, the combination of a frame carrying press boxes, plungers operating therein, pitmen connected with the plungers, a spring for retracting each pitman, a rotating eccentric for actuating the pitmen to force the plungers on their working stroke, and means actuated by said eccentric for starting the plungers on their return stroke.

3. In a baling press, the combination of a frame carrying press boxes, plungers operating therein, spring retracted pitmen connected with the plungers, an eccentric for operating the pitmen to force the same on their working stroke, levers operated by the eccentric, and means controlled by said levers for engaging the pitmen to start the plungers on their return stroke.

4. In a baling press, the combination of a frame carrying press boxes, plungers operating therein, spring retracted pitmen connected with the plungers, an eccentric for actuating the pitmen on their working stroke, each pitman being provided with a contact member, slides adapted to engage said contact members, rocking levers actuated by the eccentric, and connections between said levers and slides to move the latter into engagement with said contact members and impart movement to the pitmen to start the plungers on their return stroke.

In testimony whereof, I affix my signature in presence of two witnesses.

LEWIS P. AGNEW.

Witnesses:
JENNIE SHELTON,
F. R. AGNEW.